(12) United States Patent
Koo et al.

(10) Patent No.: US 8,945,770 B2
(45) Date of Patent: Feb. 3, 2015

(54) CATHODE ACTIVE MATERIAL EXHIBITING IMPROVED PROPERTY IN HIGH VOLTAGE

(75) Inventors: Chang-Wan Koo, Daejeon (KR); Joon Sung Bae, Daejeon (KR); Eun-Young Goh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 422 days.

(21) Appl. No.: 13/128,039

(22) PCT Filed: Nov. 10, 2009

(86) PCT No.: PCT/KR2009/006566
§ 371 (c)(1),
(2), (4) Date: Oct. 13, 2011

(87) PCT Pub. No.: WO2010/053328
PCT Pub. Date: May 14, 2010

(65) Prior Publication Data
US 2012/0034516 A1    Feb. 9, 2012

(30) Foreign Application Priority Data
Nov. 10, 2008    (KR) .................. 10-2008-0111323

(51) Int. Cl.
*H01M 4/13*    (2010.01)
*H01M 4/58*    (2010.01)
(Continued)

(52) U.S. Cl.
CPC .......... *H01M 4/505* (2013.01); *C01G 45/1228* (2013.01); *C01G 51/42* (2013.01); *C01G 51/50* (2013.01); *C01G 53/42* (2013.01); *C01G 53/50* (2013.01); *H01M 4/1315* (2013.01);
(Continued)

(58) Field of Classification Search
USPC ................ 429/218.1, 227, 223, 224, 231.95, 429/231.6, 231.8
See application file for complete search history.

(56) References Cited

U.S. PATENT DOCUMENTS

| | | | |
|---|---|---|---|
| 6,432,581 B1 * | 8/2002 | Amatucci et al. ............. 429/224 |
| 6,613,479 B2 * | 9/2003 | Fukuzawa et al. ....... 429/231.95 |
| 6,653,021 B2 | 11/2003 | Kweon et al. |
| 2005/0014072 A1 * | 1/2005 | Yamaguchi et al. .......... 429/329 |
| 2008/0102369 A1 | 5/2008 | Sakata et al. |

FOREIGN PATENT DOCUMENTS

| | | |
|---|---|---|
| CN | 1698222 | 11/2005 |
| JP | 11-345615 | 12/1999 |

(Continued)

OTHER PUBLICATIONS

International Search Report dated Jun. 29, 2010 in International Application No. PCT/KR2009/006566.

(Continued)

*Primary Examiner* — Patrick Ryan
*Assistant Examiner* — Julian Anthony
(74) *Attorney, Agent, or Firm* — Birch, Stewart, Kolasch & Birch, LLP.

(57) ABSTRACT

Disclosed herein is a cathode active material including a lithium transition metal oxide based on at least one transition metal selected from a group consisting of Ni, Mn and Co. The lithium transition metal oxide contains fluorine, and most of the fluorine is present on a surface of the lithium transition metal oxide, and at least one metal selected from a group consisting of Mg, Ti, Zr, Al and Fe as well as sulfur (S) are further contained in the lithium transition metal oxide.

17 Claims, 4 Drawing Sheets

(51) Int. Cl.
  *H01M 4/00* (2006.01)
  *H01M 4/50* (2010.01)
  *H01M 4/505* (2010.01)
  *C01G 45/12* (2006.01)
  *C01G 51/00* (2006.01)
  *C01G 53/00* (2006.01)
  *H01M 4/1315* (2010.01)
  *H01M 4/525* (2010.01)
  *H01M 10/052* (2010.01)
  *H01M 10/0567* (2010.01)

(52) U.S. Cl.
  CPC ............ *H01M4/525* (2013.01); *H01M 10/052* (2013.01); *H01M 10/0567* (2013.01); *C01P 2002/52* (2013.01); *C01P 2002/77* (2013.01); *C01P 2006/40* (2013.01); *Y02E 60/122* (2013.01); *Y02T 10/7011* (2013.01)
  USPC ........ 429/218.1; 429/223; 429/224; 429/227; 429/231.8; 429/231.95

(56) References Cited

FOREIGN PATENT DOCUMENTS

| | | |
|---|---|---|
| JP | 2000-021402 | 1/2000 |
| JP | 2003-157844 A | 5/2003 |
| JP | 2004-149409 | 5/2004 |
| JP | 2004-220801 A | 8/2004 |
| JP | 2008-536285 A | 9/2008 |
| JP | 2009-026640 | 2/2009 |
| JP | 2001-256979 A | 9/2009 |
| KR | 10-0805910 B1 | 2/2008 |
| KR | 10-0822013 B1 | 4/2008 |
| KR | 10-2009-0108570 A | 10/2009 |
| KR | 10-2010-0007236 A | 1/2010 |
| KR | 10-2010-0042145 A | 4/2010 |

OTHER PUBLICATIONS

Paulsen et al., "Core-Shell Cathode Material with Size-Dependent Composition". Electrochemical and Solid-State Letters, vol. 10, No. 4 (2007) pp. A101-A105.

\* cited by examiner

US 8,945,770 B2

CATHODE ACTIVE MATERIAL EXHIBITING IMPROVED PROPERTY IN HIGH VOLTAGE

TECHNICAL FIELD

The present invention relates to a cathode active material including a lithium transition metal oxide and, more particularly, a cathode active material which includes a lithium transition metal oxide containing fluorine, wherein most of the fluorine is present on the surface of the lithium transition metal oxide and the lithium transition metal oxide further contains at least one metal selected from a group consisting of Mg, Ti, Zr, Al and Fe as well as sulfur (S).

BACKGROUND ART

Technological development and increased demand for mobile equipment have led to a rapid increase in the demand for secondary batteries as energy sources. Among these secondary batteries, lithium secondary batteries having high energy density and output voltage, long cycle life and low self-discharge ratio are commercially available and widely used. Recently, with considerably increased demand for portable electric and/or electronic devices, demand for secondary batteries also rapidly increased and, especially, lithium secondary batteries comprise the majority of the secondary battery markets.

In addition, with the recent trend toward high performance and miniaturization of portable electric and/or electronic devices, various types of batteries with reduced size as well as high performance are required.

For laptop computer, since battery size greatly influences computer thickness, attempts to develop novel battery structures having decreased thickness as well as achieving high capacity and high performance have been made. Specifically, increased concern over environmental issues has brought about a great deal of research associated with electric vehicles (EV) and hybrid electric vehicles (HEV) as substitutes for vehicles using fossil fuels, such as gasoline vehicles and diesel vehicles, which are a major cause of air pollution.

In conventional lithium secondary batteries, a carbon material is usually used as an anode active material and use of lithium metal, a sulfur compound, or the like, is also considered. Meanwhile, lithium cobalt oxide ($LiCoO_2$) is most commonly used as the cathode active material and, in addition, other lithium transition metal oxides including, e.g., lithium manganese oxides such as $LiMnO_2$ having a layered structure, $LiMn_2O_4$ having a spinel structure, etc., lithium nickel oxides such as $LiNiO_2$, are also used.

In order to increase capacity per unit mass, it is important to develop an improved high capacity active material. However, recently developed active materials are already close to theoretical capacity, thus limiting increase in capacity.

As an alternative method, setting an operating voltage of existing active material to a high voltage may be considered to extend the ranges of charge voltage and discharge voltage, thus increasing capacity of the active material. However, conventional active materials tend to deteriorate performance of a battery at high voltage and entail a problem of shortened lifespan due to side reaction at high voltage. For instance, if charge voltage of a lithium secondary battery is continuously maintained in a high voltage state, electrolyte pyrolysis, reaction of a lithium-containing anode with electrolyte, cathode oxidation, pyrolysis of a cathode active material, or the like may occur. Consequently, serious problems may be encountered in terms of battery safety.

Therefore, there is a need for techniques to increase battery capacity by operating the battery under high voltage conditions without causing the foregoing problems.

DISCLOSURE

Technical Problem

Accordingly, the present invention has been made to solve the above and other technical problems that have yet to be resolved.

As a result of a variety of extensive and intensive studies and experiments to solve the problems as described above, the inventors of the present invention have found that, if a specific lithium transition metal oxide containing fluorine mostly present (or concentrated) on the surface of the oxide, as well as some metals and sulfur (S) is used as a cathode active material, battery capacity may be increased by operating the battery at a high voltage while preventing performance deterioration of the battery, decrease in lifespan, occurrence of side reaction, etc. The present invention was completed based on this discovery.

Technical Solution

Therefore, in an aspect of the present invention, there is provided a cathode active material including a lithium transition metal oxide based on at least one transition metal selected from a group consisting of Ni, Mn and Co, wherein the lithium transition metal oxide contains fluorine and most of the fluorine is present on the surface of the lithium transition metal oxide, and the lithium transition metal oxide further includes at least one metal selected from a group consisting of Mg, Ti, Zr, Al and Fe, as well as sulfur (S).

It was found that the cathode active material according to the present invention may be used at a high voltage of about 4.4V. Therefore, since the cathode active material of the present invention is utilized under voltage conditions including, for example, a discharge voltage of 2.5V and a charge voltage of 4.4V, preferably, 4.35V, greater capacity per unit mass may be obtained, as compared to existing cathode active materials.

A cathode active material of the present invention is characterized in that fluorine in a specific morphology is included in a lithium transition metal oxide. That is, most of the fluorine is present on the surface of the lithium transition metal oxide. Such fluorine may inhibit gas evolution due to decomposition of an electrolyte at a high voltage. Optionally, some fluorine may be doped inside the lithium transition metal oxide.

An amount of fluorine present on the surface of the lithium transition metal oxide may range from 50 to 99.9% of a total weight of fluorine. Preferably, a content of fluorine (present on the surface of the lithium transition metal oxide) is 10 wt. % or less, relative to a total weight of lithium transition metal oxide.

Furthermore, in relation to a total weight of lithium transition metal oxide, fluorine may be coated in an amount of 0.01 to 7 wt. % on the surface of the lithium transition metal oxide. Here, the foregoing coating of fluorine means physical adhesion and/or chemical combination of fluorine with the surface of the lithium transition metal oxide.

If an amount of fluorine is less than 0.01 wt. %, effects of fluorine addition are not sufficiently exhibited. On the other hand, when the amount of fluorine exceeds 7 wt. %, internal battery resistance may increase, in turn undesirably deteriorating battery performance.

If fluorine is present both on the surface of the lithium transition metal oxide and inside the same, a sharp concentration profile from higher concentration at the surface of the lithium transition metal oxide to lower concentration inside the same may be encountered.

Moreover, the lithium transition metal oxide in the cathode active material according to the present invention may contain at least one metal selected from a group consisting of Mg, Ti, Zr, Al and Fe, as well as sulfur (S). Some of the metal and sulfur may be present on the surface of the lithium transition metal oxide while the remainder may be doped inside the same.

Such components may contribute to structural stability of the lithium transition metal oxide, in turn preventing collapse of structure, degradation, etc. under high voltage conditions and inhibiting reaction of a cathode with electrolyte.

A content of the foregoing components (metal and sulfur) may range 0.01 to 10 wt. % relative to a total weight of the lithium transition metal oxide.

If the foregoing content is less than 0.01 wt. %, it may be difficult to achieve structural stability and inhibition of side reaction as described above. On the other hand, when the content exceeds 10 wt. %, an amount of transition metal is relatively decreased, leading to undesirable reduction in battery capacity.

Metals used herein may include magnesium (Mg). Mg reacts with fluorine to enable expression of excellent cycle life properties at high voltage (of 4.2V or more). That is, it may be assumed that Mg is partially combined with the surface of the lithium transition metal oxide to maintain a crystal lattice structure, thus imparting structural stability against expansion/shrinkage, and reduces opportunities for transition metal atoms to directly contact the electrolyte, thus inhibiting deterioration of the lithium transition metal oxide under high voltage conditions.

Sulfur contained in the lithium transition metal oxide may be partially present on the surface of the lithium transition metal oxide and the remainder may be doped inside the same. A content of S may range from 0.005 to 5 wt. % relative to a total weight of the lithium transition metal oxide.

The lithium transition metal oxide of the present invention may include a variety of combinations depending upon kinds of transition metal and, according to a preferred embodiment, a lithium transition metal oxide represented by the following Formula 1 may be employed:

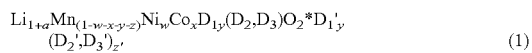

(1)

In the above Formula 1,
$-0.3 \le a \le 0.3$; $0 \le w < 0.8$; $0 < x < 0.8$; $0.001 < y < 0.02$; $0.005 < z < 0.1$; $0 \le (1-w-x-y-z) < 0.5$;

$D_1$ is fluorine;

$D_2$ is at least one or two selected from a group consisting of Mg, Ti, Zr, Al and Fe;

$D_3$ is sulfur;

y denotes a doping amount of $D_1$;

z denotes the sum of doping amounts of $D_2$ and $D_3$;

$D_1'$, $D_2'$ and $D_3'$ denote $D_1$, $D_2$ and $D_3$ present on the surface of the lithium transition metal oxide, respectively;

y' denotes a coating amount of $D_1$, provided that the sum of y' and y ranges from 0.01 to 7 wt. % relative to a total weight of lithium transition metal oxide; and z' denotes the sum of coating amounts of $D_2'$ and $D_3'$, provided that the sum of z' and z ranges from 0.01 to 10 wt. % relative to a total weight of lithium transition metal oxide.

Such lithium transition metal oxide may be generally classified into one containing Co alone and another containing a combination of Ni, Mn and Co.

If the lithium transition metal oxide contains a combination of Ni, Mn and Co, Ni content may be higher than Mn and Co contents and, preferably, range from 40 to 70% relative to total moles of transition metal. According to the constitutional composition as described above, the lithium transition metal mixed oxide may have an excellent crystal structure.

More particularly, as shown in FIG. 1, lithium nickel-manganese-cobalt oxide having an Ni content of 40 to 70% relative to a total amount of nickel-manganese-cobalt may absorb and emit lithium ions between mixed transition metal oxide layers, and Ni ions derived from the mixed transition metal layers are inserted into a reversible lithium layer for sorption and discharge of lithium ions, thereby enabling interconnection of the mixed transition metal oxide layers.

In general, if a lithium nickel-manganese-cobalt oxide having a layered crystal structure and a high Ni content is used as a cathode active material, lithium is de-inserted from a reversible lithium layer during charging, causing the crystal structure to expand and become unstable due to repulsive force between oxygen atoms in mixed transition metal oxide layers. As result, the crystal structure is modified in the course of repeated charge/discharge, thus significantly decreasing capacity and cycle life.

On the other hand, a lithium nickel-manganese-cobalt oxide having a specific composition according to the present invention has a reversible lithium layer containing some Ni ions inserted therein and combined therewith and, therefore, even when lithium is emitted during charging, an oxidation number of the Ni ions inserted into the reversible lithium layer is not altered, thus having a layered structure suitably grown without collapse of the crystal structure. Accordingly, when a lithium nickel-manganese-cobalt oxide having the foregoing structure is used as a cathode active material, the battery may have high capacity and excellent cycle life.

The above results substantially conflict with the conventional idea that some nickel ions moving into a lithium layer and then being immobilized therein would prevent sorption/discharge of lithium. That is, further collapse of the structure due to oxygen de-insertion may not occur and further generation of $Ni^{2+}$ may be inhibited, thus simultaneously improving battery lifespan and safety. Moreover, desired high rate properties may be attained.

According to a preferred embodiment of the present invention, $Ni^{2+}$ and $Ni^{3+}$ may coexist in the nickel-manganese-cobalt oxide layer described above and this layer may have a structure wherein some $Ni^{2+}$ ions are inserted into a reversible lithium layer. That is, in such a structure, Ni ions inserted into the reversible lithium layer are substantially $Ni^{2+}$ and may have an oxidation number that is unchanged during charging.

More particularly, when a lithium transition metal mixed oxide having excess nickel, in which $Ni^{2+}$ and $Ni^{3+}$ coexist, is in an oxygen-deficient state under a predetermined condition (reaction atmosphere, Li content, etc.), an oxidation number of Ni may be altered and some $Ni^{2-}$ ions may be inserted into a reversible lithium layer.

With regard to the cathode active material of the present invention, the lithium transition metal oxide may be prepared by mixing a lithium precursor, a transition metal precursor and a doping metal precursor such as fluoride ('doping metal fluoride'), and then, sintering the mixture. The lithium precursor may be, for example, lithium carbonate, while the transition metal precursor may be, for example, a transition metal oxide, a mixed transition metal hydrate, etc.

Sulfur in the lithium transition metal oxide described above may be derived from the transition metal precursor or the doping metal precursor or, otherwise, may be provided by adding sulfuric acid or sulfate during production thereof.

The sintering may be executed, for example, at 900 to 1100° C. for 1 to 20 hours. However, these sintering conditions may vary depending upon constitutional composition without particular limitation.

The present invention also provides a lithium secondary battery including the cathode active material described above. The lithium secondary battery may comprise, for example, a cathode, an anode, a separator and a non-aqueous electrolyte containing lithium salt.

The cathode is fabricated by, for example, applying a mixture of the cathode active material, a conductive material and a binder to a cathode current collector and drying the coated collector. If necessary, a filler may further be added to the mixture. Also, the anode is fabricated by, for example, applying an anode active material to an anode current collector then drying the coated collector. If necessary, the anode may further include the foregoing components.

Examples of the anode active material may include: carbon and graphite materials such as natural graphite, artificial graphite, expanded graphite, carbon fiber, non-graphitizing carbon (often referred to as 'hard carbon'), carbon black, carbon nanotubes, Fullerene, activated carbon, etc.; metals alloyable with lithium, such as Al, Si, Sn, Ag, Bi, Mg, Zn, In, Ge, Pb, Pd, Pt, Ti, etc., as well as compounds containing the same; combination of carbon and graphite materials with metals and compounds thereof; lithium containing nitrides, and so forth. Among these, carbon active materials, silicon active materials, tin active materials or silicon-carbon active materials are preferably used and these materials may be used alone or in combination of two or more thereof.

The separator is interposed between the cathode and the anode and may be formed using a thin insulation film having a high ion permeability and excellent mechanical strength. The separator typically has a pore diameter of 0.01 to 10 μm and a thickness of 5 to 300 μm. As the separator, a sheet or non-woven fabric made of olefin polymer such as polypropylene and/or glass fibers or polyethylene, which have chemical resistance and hydrophobicity, are used. When a solid electrolyte comprising polymer is employed as the electrolyte, the solid electrolyte may also serve as the separator.

Examples of the binder may include polyvinylidene fluoride, polyvinyl alcohol, carboxymethyl cellulose (CMC), starch, hydroxypropyl cellulose, regenerated cellulose, polyvinylidone, tetrafluoroethylene, polyethylene, polypropylene, ethylene-propylene-diene terpolymer (EPDM), sulfonated EPDM, styrene butylene rubber, fluorinated rubber, various copolymers, polymer high-saponified polyvinyl alcohol, and so forth.

The conductive material is generally used to improve conductive properties of an electrode active material and may be added in an amount of 1 to 30 wt. % relative to a total weight of an electrode mix. Such conductive material is not particularly restricted so long as it has conductive properties without causing chemical modification to a battery. The conductive material may include, for example: graphite such as natural graphite or artificial graphite; carbon black such as carbon black, acetylene black, ketchen black, channel black, furnace black, lamp black, summer black, etc.; carbon derivatives such as carbon nanotubes or Fullerene; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

A viscosity modifier serves to control viscosity of an electrode mix in order to facilitate mixing of electrode materials and application thereof to a current collector, and may be added in an amount of 30 wt. % or less, relative to a total weight of the electrode mix. Examples of the viscosity modifier may include, but are not limited to, carboxymethyl cellulose, polyvinylidene fluoride, etc. Optionally, a solvent may also serve as the viscosity modifier.

The filler used herein is a supplementary ingredient to inhibit expansion of an electrode and is not particularly restricted so long as it comprises fibrous materials without causing chemical modification of a battery. The filler may include, for example, olefin polymers such as polyethylene, polypropylene, etc., fibrous materials such as glass fiber or carbon fiber, and so forth.

A coupling agent is a supplementary ingredient to improve adhesion between an electrode active material and the binder, is characterized by having at least two functional groups, and may be added in an amount of up to 30 wt. % in relation a total weight of the binder. The coupling agent may comprise a material, of which one functional group reacts with a hydroxyl group or carboxyl group on a surface of silicon, tin or graphite-based active material to generate a chemical bond while the remaining functional group(s) reacts(react) with a polymer binder to generate another chemical bond. A particular example of such coupling agent may be a silane coupling agent such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, cyanatopropyl triethoxysilane, etc., without being particularly limited thereto.

An adhesion enhancer used herein is a supplementary ingredient to increase adhesion of the active material to a current collector and may be added in an amount of 10 wt. % or less, relative to a total weight of the binder. Examples of the adhesion enhancer may include oxalic acid, adipic acid, formic acid, acrylic acid derivatives, itaconic acid derivatives, or the like.

A molecular weight regulator used herein may include, for example, t-dodecylmercaptan, n-dodecylmercaptan, n-octylmercaptan, etc. A cross-linking agent used herein may include, for example, 1,3-butandiol diacrylate, 1,3-butandiol dimethacrylate, 1,4-butandiol diacrylate, 1,4-butandiol dimethacrylate, aryl acrylate, aryl methacrylate, trimethylolpropane, triacrylate, tetraethyleneglycol diacrylate, tetraethyleneglycol dimethacrylate, divinylbenzene, or the like.

The current collector used in the electrode is a site on which electrons move during electrochemical reaction of the active material and may include an anode current collector and a cathode current collector, in terms of electrode type.

The anode current collector is generally fabricated to have a thickness in the range of 3 to 500 μm. Such anode current collector is not particularly restricted so long as it has favorable conductivity without causing chemical modification to a battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and so forth.

The cathode current collector is generally fabricated to have a thickness in the range of 3 to 500 μm. Such cathode current collector is not particularly restricted so long as it has high conductivity without causing chemical modification of a battery. For example, the cathode current collector may be fabricated using stainless steel, aluminum, nickel, titanium, calcined carbon, or stainless steel or aluminum surface-treated with carbon, nickel, titanium or silver, and so forth.

The current collector may be processed to have fine irregularities on the surface thereof, so as to enhance adhesion to an electrode active material. In addition, the current collector may have various forms including films, sheets, foils, nets, porous structures, foams, non-woven fabrics, etc.

The non-aqueous electrolyte containing lithium salt comprises a lithium salt as well as a non-aqueous electrolyte.

The non-aqueous electrolyte may be an aprotic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivative; sulfolane; methyl sulfolane; 1,3-dimethyl-2-imidazolidinone; propylene carbonate derivative; tetrahydrofuran derivative; ether; methyl propionate; ethyl propionate, or the like.

The lithium salt is a material readily dissolved in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imide, or the like.

Optionally, an organic solid electrolyte, inorganic solid electrolyte, or the like, may also be used.

Examples of such organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociated groups, or the like.

Examples of such inorganic solid electrolyte may include nitrides, halides and/or sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—NiOH, $Li_3PO_4$—$Li_2S$—$SiS_2$, etc.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

Preferably, in order to improve safety at a high voltage, fluoro-ethylene carbonate (FEC), propene sultone (PRS) or fluoro-propylene carbonate (FPC), or the like, may further be added to the non-aqueous electrolyte. In this regard, according to Experimental Example 4 described below, it was found that safety is remarkably improved when a temperature of a lithium secondary battery containing PRS, FEC, etc., is increased to a high level under high voltage conditions.

In this case, an amount of added PRS and/or FEC may range from 0.01 to 5 wt. % relative to a total weight of the electrolyte.

The lithium secondary battery according to the present invention may be fabricated by any conventional method well known in the art. Furthermore, structures of the cathode, anode and separator in the lithium secondary battery are not particularly restricted. For example, each of the foregoing structures may be fabricated by inserting a sheet into a cylindrical, angular or pouch type case, in a winding mode or stacking mode.

The lithium secondary battery according to the present invention may be effectively used as a power source of a hybrid car, an electric car, a power tool, etc., which require high rate properties and high-temperature stability, or the like.

BRIEF DESCRIPTION OF THE DRAWINGS

The above and other objects, features and other advantages of the present invention will be more clearly understood from the following detailed description taken in conjunction with the accompanying drawings, in which.

BEST MODE

Figure 1:
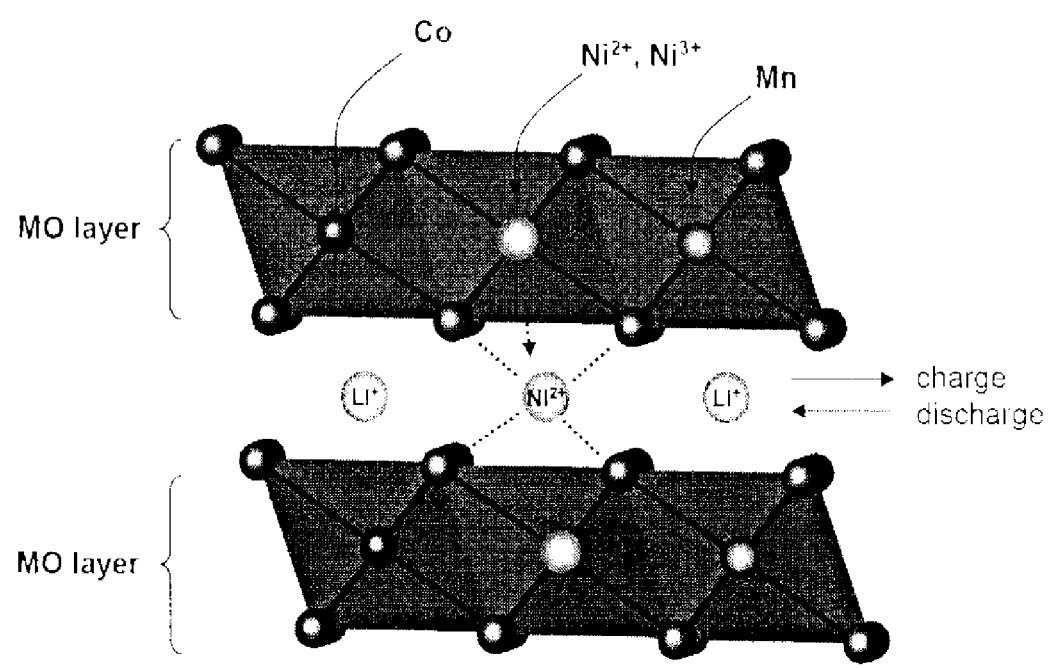
FIG. 1 is a schematic view illustrating a crystal structure of a cathode active material according to an embodiment of the present invention.

The present invention will be described in more detail with reference to the following Examples. These examples are provided only to illustrate the present invention and should not be construed as limiting the scope and spirit of the present invention.

Example 1

$Co_3O_4$ as a transition metal precursor, 0.01 wt. % of $MgF_2$ as a doping metal precursor, and $Li_2CO_3$ were mixed in stoichiometric relative ratio to prepare a mixture. A predetermined amount of sulfuric acid was added to the mixture such that a final product, that is, a lithium transition metal oxide has a sulfur content of 0.005 wt. %. The mixture was subjected to sintering at 1000° C. for 10 hours, resulting in the lithium transition metal oxide comprising $LiCoO_2$ and Mg, F and S contained therein.

Example 2

A lithium transition metal oxide was prepared according to the same procedure as described in Example 1, except that the doping metal precursor was added in an amount of 0.1 wt. % relative to a total weight of the mixture to be sintered.

Example 3

A lithium transition metal oxide was prepared according to the same procedure as described in Example 1, except that the doping metal precursor was added in an amount of 0.25 wt. % relative to a total weight of the mixture to be sintered.

Example 4

A lithium transition metal oxide was prepared according to the same procedure as described in Example 1, except that the doping metal precursor was added in an amount of 0.5 wt. % relative to a total weight of the mixture to be sintered.

Example 5

A lithium transition metal oxide was prepared according to the same procedure as described in Example 1, except that the doping metal precursor was added in an amount of 0.75 wt. % relative to a total weight of the mixture to be sintered.

Example 6

A lithium transition metal oxide was prepared according to the same procedure as described in Example 1, except that the doping metal precursor was added in an amount of 1.0 wt. % relative to a total weight of the mixture to be sintered.

Comparative Example 1

A lithium transition metal oxide ($LiCoO_2$) was prepared according to the same procedure as described in Example 1, except that the doping metal precursor was excluded.

Experimental Example 1

An amount of Mg remaining in each of the prepared lithium transition metal oxides prepared in Examples 1 to 6 and Comparative Example 1 was measured, and results thereof are shown in the following Table 1.

TABLE 1

| | Feeding amount of doping metal precursor (wt. %) | Mg doping amount (ppm) | Mg coating amount (ppm) |
|---|---|---|---|
| Example 1 | 0.01 | 80 | 20 |
| Example 2 | 0.1 | 500 | 300 |
| Example 3 | 0.25 | 1200 | 1000 |
| Example 4 | 0.5 | 2800 | 1300 |
| Example 5 | 0.75 | 5300 | 2500 |
| Example 6 | 1.0 | 8300 | 3500 |
| Comparative Example 1 | 0 | 10 | 0 |

As shown in TABLE 1, it can be seen that Mg derived from metal fluoride used as a doping metal additive was not only doped inside the lithium transition metal oxide but also applied to the surface thereof. It was found that an amount of Mg doped inside the lithium transition metal oxide is greater than an amount of Mg applied to the surface thereof.

Alternatively, in order to investigate states of F contained in the lithium transition metal oxide, which is derived from the doping metal additive, each of the lithium transition metal oxides prepared in Examples 3, 4 and 6, and Comparative Example 1 was subjected to ESCA analysis. A part of analyzed results is shown in the following Table 2. In TABLE 2, a numerical value in 'nm' denotes a depth from the surface of the lithium transition metal oxide.

TABLE 2

| | Feeding amount of doping metal precursor (wt. %) | 0 nm (wt. %) | 10 nm (wt. %) | 20 nm (wt. %) | 30 nm (wt. %) |
|---|---|---|---|---|---|
| Example 3 | 0.25 wt. % | 2.2 | 1.5 | 1.0 | 0.5 |
| Example 4 | 0.5 wt. % | 5.0 | 1.7 | 1.2 | 0.5 |
| Example 6 | 1.0 wt. % | 6.4 | 2.5 | 2.0 | 1.5 |
| Comparative Example 1 | 0 wt. % | — | — | — | — |

As shown in TABLE 2, it was confirmed that F derived from the doping metal precursor is mostly present on the surface of the lithium transition metal oxide while some F is present inside the same. Moreover, it can be seen that F distribution from the surface of the lithium transition metal oxide toward the inside thereof shows a sharp profile of decreased concentration.

Although not numerically demonstrated by the present experimental results, for example, it was confirmed that S may be contained in the lithium transition metal oxide, depending upon concentration of sulfuric acid added to a sintered mixture. Moreover, it can be seen that S distribution shows a smooth profile of decreased concentration from the surface of the lithium transition metal oxide toward the inside thereof.

Furthermore, other than Mg, if Ti is used, Ti distribution has an approximately uniform profile of concentration from the surface of the lithium transition metal oxide toward the inside thereof.

Example 7

The lithium transition metal oxide prepared in Example 1 was mixed with 1.0 wt. % of carbon black as a conductive material, followed by adding 3 wt. % of PVdF, thus preparing a cathode mix. After agitating the cathode mix with NMP as a solvent, the mixture was applied to an aluminum foil as a metal current collector. The coated foil was dried in a vacuum oven at 120° C. for 2 hours or more, thus forming a cathode. Then, using the formed cathode, an anode formed by applying MCMB artificial graphite to a copper foil and a polypropylene porous separator, an electrode assembly was fabricated. After placing the electrode assembly in an angled cylindrical can, an electrolyte comprising 1M $LiPF_6$ dissolved in a solution of ethylene carbonate (EC) and dimethyl carbonate (DMC) in a ratio by volume of 1:1 was introduced into the can. Next, a cap assembly such as CID was mounted on an open top of the can to thereby fabricate a lithium secondary battery.

Example 8

A lithium secondary battery was fabricated by the same procedure as described in Example 7, except that the lithium transition metal oxide prepared in Example 2 was used.

Example 9

A lithium secondary battery was fabricated by the same procedure as described in Example 7, except that the lithium transition metal oxide prepared in Example 3 was used.

Example 10

A lithium secondary battery was fabricated by the same procedure as described in Example 7, except that the lithium transition metal oxide prepared in Example 4 was used.

Comparative Example 2

A lithium secondary battery was fabricated by the same procedure as described in Example 7, except that the lithium transition metal oxide prepared in Comparative Example 1 was used.

Experimental Example 2

For batteries fabricated in Examples 7 to 10 and Comparative Example 2, high voltage lifespan properties were determined Determination of such high voltage lifespan properties was performed by measuring discharge capacity while repeating 300 charge/discharge cycles, wherein each cycle comprises charging the battery to 50 Ma in constant current/constant voltage (CC/CV) charge mode at 1 C and 4.4V, then, discharging the same in CC discharge mode under cut-off conditions of 1 C and 3.0V. Results thereof are shown in FIG. 2.

Figure 2:
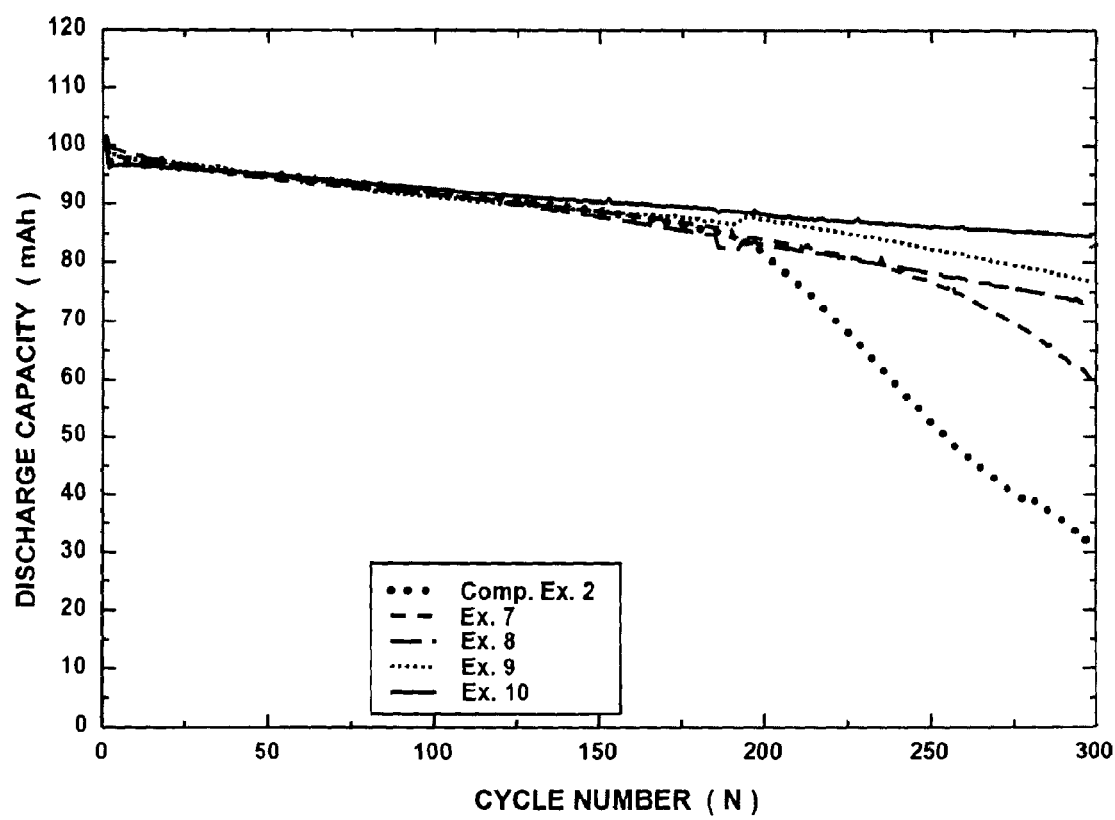
FIG. 2 is graphs showing lifespan properties of batteries fabricated in Examples 7 to 10 of the present invention and Comparative Example 2, under overcharge conditions in Experimental Example 2 of the present invention.

As shown in FIG. 2, for the battery fabricated in Comparative Example 2, the discharge capacity began to decrease at the $200^{th}$ cycle and was decreased to about 30% of initial capacity by the $300^{th}$ cycle. On the other hand, the batteries fabricated in Examples 7 to 10 showed much less capacity decrease, as compared to the battery of Comparative Example 2. Specifically, the batteries of Examples 8 to 10 had capacity of at least 70% of initial capacity at the $300^{th}$ cycle.

Example 11

A lithium transition metal oxide was prepared by the same procedure as described in Example 1, except that sulfuric acid was added thereto such that a final product, that is, the lithium transition metal oxide has a sulfur content of 0.01 wt. %. Using the prepared lithium transition metal oxide, a lithium secondary battery was fabricated by the same procedure as described in Example 7.

Example 12

A lithium transition metal oxide was prepared by the same procedure as described in Example 1, except that sulfuric acid was added thereto such that a final product, that is, the lithium transition metal oxide has a sulfur content of 0.024 wt. %. Using the prepared lithium transition metal oxide, a lithium secondary battery was fabricated by the same procedure as described in Example 7.

Comparative Example 3

A lithium transition metal oxide was prepared by the same procedure as described in Example 1, except that sulfuric acid was not added thereto. Using the prepared lithium transition metal oxide, a lithium secondary battery was fabricated by the same procedure as described in Example 7.

Experimental Example 3

Figure 3:
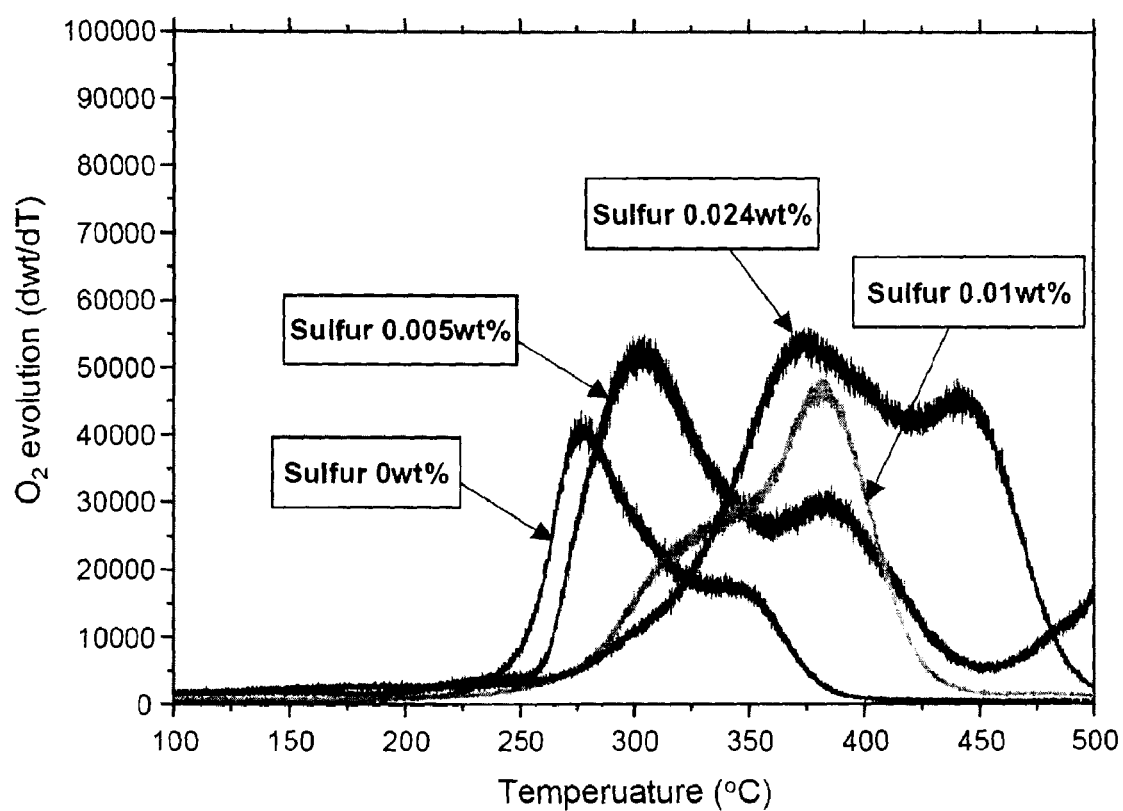
FIG. 3 is graphs showing amounts of $O_2$ evolution from batteries fabricated in Examples 7, 11 and 12 of the present invention and Comparative Example 3, depending upon increase of temperature under high voltage conditions.

After each of the lithium secondary batteries fabricated in Examples 7, 11, 12 and Comparative Example 3 was charged to 4.35V, $O_2$ evolution during elevating a temperature of the battery in a chamber was measured. Measured results are shown in FIG. 3.

If temperature increases under high voltage conditions, $O_2$ is typically released, in turn collapsing a structure of the lithium transition metal oxide. As shown in FIG. 3, it can be seen that increase in S content may raise a temperature at which oxygen release is induced. Therefore, it can be identified that structural stability is improved by increasing S content of the lithium transition metal oxide, thus enhancing safety of the secondary battery.

Example 13

A lithium transition metal oxide was prepared by the same procedure as described in Example 1, except that sulfuric acid was added thereto such that a final product, that is, the lithium transition metal oxide had a sulfur content of 0.02 wt. %. Using the prepared lithium transition metal oxide, a lithium secondary battery was fabricated by the same procedure as described in Example 7.

Example 14

A lithium transition metal oxide was prepared by the same procedure as described in Example 1, except that sulfuric acid was added thereto such that a final product, that is, the lithium transition metal oxide had a sulfur content of 0.02 wt. %. A lithium secondary battery was fabricated by the same procedure as described in Example 7, except that the prepared lithium transition metal oxide was used and 1 wt. % of propene sultone (PRS) relative to a total weight of an electrolyte was added to the electrolyte.

Example 15

A lithium secondary battery was fabricated by the same procedure as described in Example 14, except that 1 wt. % of fluoro-ethylene carbonate (FEC) relative to a total weight of an electrolyte was added to the electrolyte.

Example 16

A lithium secondary battery was fabricated by the same procedure as described in Example 14, except that 1 wt. % of PRS and 1 wt. % of FEC were added to the electrolyte.

Experimental Example 4

Figure 4:
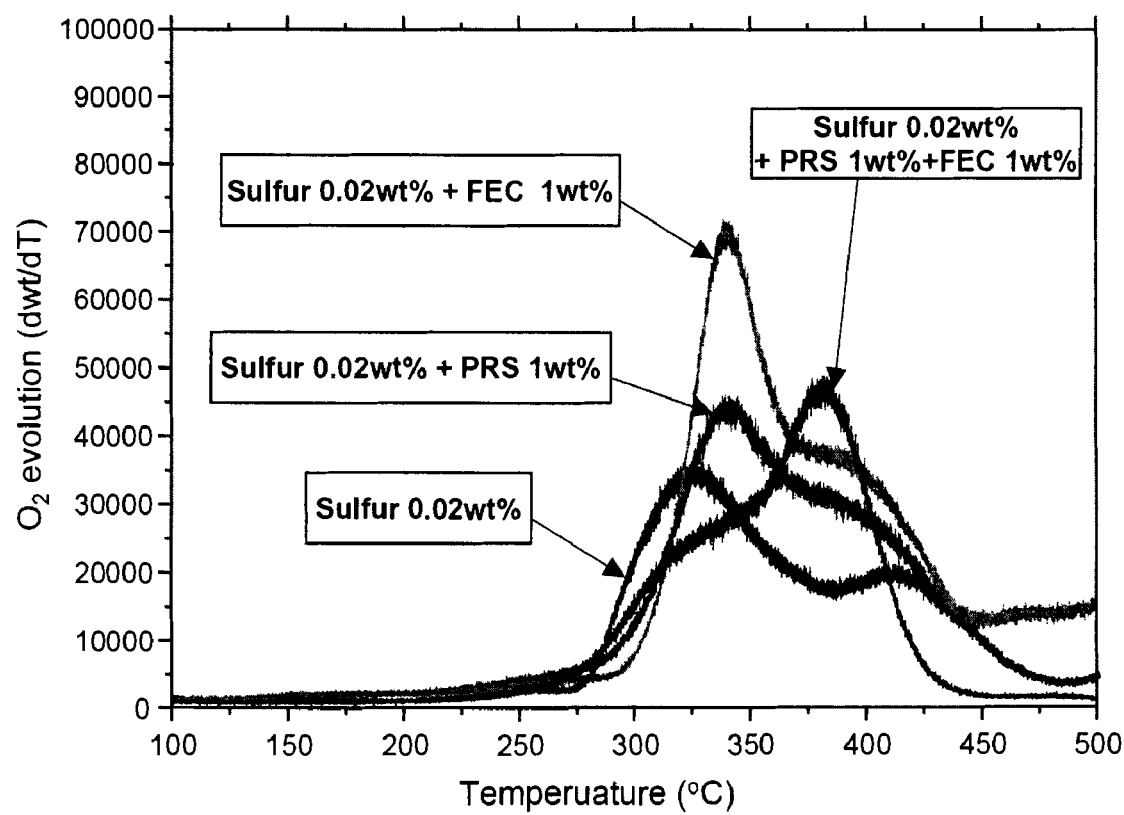
FIG. 4 is graphs showing amounts of $O_2$ evolution from batteries fabricated in Examples 13 to 16 of the present invention, depending upon temperature increase under high voltage conditions.

For the lithium secondary batteries fabricated in Examples 13 to 16, the same experiment as described in Experimental Example 3 was repeated and results thereof are shown in FIG. 4.

As shown in FIG. 4, it was found that a temperature at which oxygen is released may be raised by adding PRS or FEC and, especially, a temperature at which oxygen release reaches the maximum level may be further raised by adding both PRS and FEC.

INDUSTRIAL APPLICABILITY

As apparent from the foregoing description, a cathode active material according to the present invention can be used at a high voltage without considerable deterioration of electrical properties of a battery, thereby improving high voltage properties and enabling significant increase in battery capacity.

Those skilled in the art will appreciate that various modifications and alterations may be possible, based on the foregoing description, without departing from the scope and spirit of the invention as defined in the appended claims.

The invention claimed is:

1. A cathode active material comprising:
a lithium transition metal oxide based on at least one transition metal selected from the group consisting of Ni, Mn and Co, wherein the lithium transition metal oxide contains fluorine, 50 to 99.9% of a total weight of fluorine contained in the active material is present on a surface of the lithium transition metal oxide, and at least one metal selected from a group consisting of Mg, Ti, Zr, Al and Fe as well as sulfur (S) are further contained in the lithium transition metal oxide,
wherein a content of the sulfur ranges from 0.005 to 5 wt. % relative to a total weight of the lithium transition metal oxide,
wherein the lithium transition metal oxide is represented by the following Formula 1:

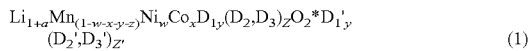  (1)

wherein, $-0.3 \le a \le 0.3$; $0 \le w < 0.8$; $0 < x < 0.8$; $0.001 < y < 0.02$; $0.005 < z < 0.1$; $0 \le (1-w-x-y-z) < 0.5$;
$D_1$ is fluorine;
$D_2$ is at least one or two selected from a group consisting of Mg, Ti, Zr, Al and Fe;
$D_3$ is sulfur;
y denotes a doping amount of $D_1$;
z denotes the sum of doping amounts of $D_2$ and $D_3$;
$D_1'$, $D_2'$ and $D_3'$ denote $D_1$, $D_2$ and $D_3$ present on the surface of the lithium transition metal oxide, respectively;
y' denotes a coating amount of $D_1$, provided that the sum of y' and y ranges from 0.01 to 7 wt. % relative to a total weight of lithium transition metal oxide; and
z' denotes the sum of coating amounts of $D_2'$ and $D_3'$, provided that the sum of z' and z ranges from 0.01 to 10 wt. % relative to a total weight of lithium transition metal oxide.

2. The cathode active material according to claim 1, wherein a content of fluorine in the lithium transition metal oxide is 10 wt. % or less relative to a total weight of the lithium transition metal oxide.

3. The cathode active material according to claim 2, wherein fluorine is doped inside the lithium transition metal oxide.

4. The cathode active material according to claim 2, wherein the at least one metal includes Mg.

5. The cathode active material according to claim 1, wherein 0.01 to 7 wt. % of fluorine relative to a total weight of the lithium transition metal oxide is coated on the surface of the lithium transition metal oxide.

6. The cathode active material according to claim 1, wherein the fluorine has a concentration profile from higher concentration at the surface of the lithium transition metal oxide to lower concentration inside the lithium transition metal oxide.

7. The cathode active material according to claim 1, wherein metal is present on the surface of the lithium transition metal oxide while the remainder of the metal is doped inside the lithium transition metal oxide.

8. The cathode active material according to claim 1, wherein a content of the metal ranges from 0.01 to 10 wt. % relative to a total weight of the lithium transition metal oxide.

9. The cathode active material according to claim 1, wherein some sulfur is present on the surface of the lithium transition metal oxide while the remainder of the sulfur is doped inside the lithium transition metal oxide.

10. The cathode active material according to claim 1, wherein the lithium transition metal oxide is a lithium nickel-manganese-cobalt oxide having a nickel content of 40 to 70% relative to a total amount of nickel-manganese-cobalt.

11. A lithium secondary battery comprising the cathode active material according to claim 1.

12. The lithium secondary battery according to claim 11, wherein an electrolyte further contains propene sultone (PRS) and/or fluoro-ethylene carbonate (FEC) as an additive.

13. The cathode active material according to claim 1, wherein the at least one metal is Mg,
wherein the amount of Mg doped inside the lithium transition metal oxide is 80-8300 ppm,
wherein the amount of Mg coated to the surface of the lithium transition metal oxide is 20-3500 ppm, and
wherein the amount of Mg doped inside the lithium transition metal oxide is greater than an amount of Mg applied to the surface thereof.

14. The cathode active material according to claim 1, wherein the content of the sulfur ranges from 0.01 to 5 wt. % relative to a total weight of the lithium transition metal oxide.

15. A method for preparing a lithium transition metal oxide according to claim 1, the method comprising:
mixing a lithium precursor, a transition metal precursor and fluoride as a doping metal precursor ('doping metal fluoride') and
sintering the mixture.

16. The method according to claim 15, wherein the transition metal precursor is a transition metal oxide.

17. The method according to claim 16, further comprising addition of sulfuric acid or sulfate.

* * * * *